United States Patent
Harootian, Jr.

[11] Patent Number: 5,303,373
[45] Date of Patent: Apr. 12, 1994

[54] ANAMORPHIC FUSED FIBER OPTIC BUNDLE

[75] Inventor: Simon G. Harootian, Jr., Worcester, Mass.

[73] Assignee: Schott Fiber Optics, Inc., Southbridge, Mass.

[21] Appl. No.: 961,799

[22] Filed: Oct. 16, 1992

[51] Int. Cl.$^5$ .............................................. G02B 6/06
[52] U.S. Cl. ...................................... 385/115; 385/121
[58] Field of Search ................. 385/116, 120, 121, 115

[56] References Cited

U.S. PATENT DOCUMENTS

| | | | |
|---|---|---|---|
| 3,190,735 | 6/1965 | Kapany | 65/4 |
| 3,204,326 | 9/1965 | Granitsas | 29/155.5 |
| 3,626,040 | 12/1971 | Nagao et al. | 65/4 |
| 3,874,783 | 4/1975 | Cole | 385/120 X |
| 3,933,556 | 1/1976 | Strack | 385/121 X |
| 4,026,693 | 5/1977 | Sato | 385/121 X |
| 4,076,978 | 2/1978 | Brennan et al. | 250/213 |
| 4,099,833 | 7/1978 | Tosswill | 385/120 X |
| 4,175,940 | 11/1979 | Siegmund | 65/4 A |
| 4,758,064 | 7/1988 | Neefe | 350/96.23 |
| 4,911,528 | 3/1990 | Polaert | 385/120 X |
| 4,952,022 | 8/1990 | Genovese | 385/116 |
| 5,011,557 | 4/1991 | Tsugita et al. | 156/180 |
| 5,030,265 | 7/1991 | Suzuki et al. | 65/158 |
| 5,045,100 | 9/1991 | Smith et al. | 65/4.21 |
| 5,066,087 | 11/1991 | Yamauchi et al. | 385/43 |
| 5,077,820 | 12/1991 | Tokuda et al. | 385/121 X |

*Primary Examiner*—John D. Lee
*Assistant Examiner*—Hemang Sanghavi
*Attorney, Agent, or Firm*—Millen, White, Zelano, & Branigan

[57] ABSTRACT

An anamorphic, tapered fused fiber optic bundle is provided having a longitudinal axis Z and two ends each having surfaces in a plane (X axis/Y axis) perpendicular to said Z axis, a first end having cross-sectional dimensions X and Y and a second end having dimensions X' and Y', at least X' being smaller than X, and the ratio X'/X being different from the ratio Y'/Y, wherein the X axis dimension of said fiber continuously varies along said Z axis from the value X in said first end to the value X' in said second end.

24 Claims, 5 Drawing Sheets

ANAMORPHIC FUSED FIBER OPTIC BUNDLE

This invention relates to an anamorphic fused fiber optic bundle continuously tapered from the dimensions of one end to the dimensions of its other end and usable for coupling imaging devices having active area formats of different shapes, dimensions, aspect ratios, etc. while maintaining the same number of active pixels (fiber elements) at each end of the bundle.

BACKGROUND OF THE INVENTION

Methods are well-known for fusing bundles of optical fibers. The methods involved fusing individual fibers (e.g., U.S. Pat. No. 3,626,040 and U.S. Pat. No. 5,045,100) or preform blocks of fibers (multi or multi-multi-fiber bundles) (U.S. Pat. No. 4,175,940) using conventional methods under well-known conditions and techniques. Such methods have been applied to a wide variety of optical fiber glass types (or polymer (U.S. Pat. No. 4,758,064)), sizes, and applications. Fusing techniques are also utilized for formation of other fiber optic structures such as couplers (U.S. Pat. No. 5,066,087). U.S. Pat. No. 3,204,326 also discloses fusing processes using rolling mill equipment where fused bundles of a variety of cross-sectional shapes are produced from unfused original assemblies of a variety of shapes.

It is also known to draw out such fused fiber optic bundles by conventional pulling or drawing processes. These methods are utilized simply to decrease the overall dimension of a given fiber optic bundle or to prepare tapered optical fibers (U.S. Pat. Nos. 4,115,940, 3,190,735 and 4,076,978) having ends of proportionately decreased dimensions.

A typical application of such drawn tapered fiber optic bundles is for coupling imaging devices having disproportionate formats, e.g., different sized rectangles at each end, a rectangle at one end and at square at the other end, a circle at one end and a square at the other end, etc. In conventional practice, a fiber optic bundle best accommodating the larger imaging device is tapered such that its other end accommodates to the extent possible the smaller imaging device. These conventional tapers are produced by the drawing processes and simply proportionately reduce at the smaller end the center-to-center fiber spacing at the original larger end. Thus, the size modifications along each of the X and Y axes at each end of the tapered fiber bundle are equivalent. Coupling of the two disproportionate imaging devices by such a conventional tapered bundle is accomplished by over- and/or under-filling each of the formats, thereby leaving ineffective either some fiber optic pixels or some border area of the imaging device. This reduces both the number of active pixels and system resolution.

In certain situations, pressing techniques have also been applied to fiber optic bundles. Typically, these techniques are employed to fuse the bundles, as discussed in the references above, e.g., U.S. Pat. No. 3,626,040. Emphasis is placed on uniform application of pressure in order to avoid non-uniformities, especially distortions of the fibers in the bundles, especially the outer fibers (See, e.g., U.S. Pat. No. 4,175,940.)

Pressing techniques have not heretofore been applied to the production of tapers because of the serious tendency toward introducing distortions in the outer fibers caused by effects of heat or non-uniform pressing imposed, e.g., by contact between the pressing device and the fiber bundle. Such defects were noted in the conventional uniform pressing operations used to fuse fibers; heretofore, the problems were expected to be greatly exacerbated were a taper to have been attempted where the shape of the fiber at each end of the taper is to be different and/or the ratio of the fiber dimensions along the X and Y axes is to be changed disproportionately (the Z axis being the longitudinal axis of the fiber).

Consequently, there remains a need for a tapered anamorphic fused fiber optic bundle where the shape at one end is configured to fit precisely the corresponding cross-sectional shape of an imaging device and the shape at the other end is configured to fit precisely the cross-sectional surface area of a second imaging device to be coupled to the first, and wherein the cross-sectional dimensions at one end are anamorphic with respect to the other.

SUMMARY OF THE INVENTION

This invention provides an anamorphic fused fiber optic bundle which is tapered from the cross-sectional geometry at one end to a different cross-sectional geometry at the other end and which is useful to couple imaging devices.

Thus, this invention relates to an anamorphic, tapered fused fiber optic bundle having a longitudinal axis Z and two ends each having surfaces in a plane (X axis/Y axis) perpendicular to said Z axis, a first end having cross-sectional dimensions X and Y and a second end having dimensions X' and Y', at least X' being smaller than X, and the ratio X'/X being different from the ratio Y'/Y, wherein the X axis dimension of said fiber continuously varies along said Z axis from the value X in said first end to the value X' in the second end.

In another aspect, this invention relates to a method of preparing an anamorphic, tapered fused fiber optic bundle having a longitudinal axis Z and two ends each having surfaces in a plane (X axis/Y axis) perpendicular to said Z axis, a first end having cross-sectional dimensions X and Y and a second end having dimensions X' and Y', at least X' being smaller than X, and the ratio X'/X being different from the ratio Y'/Y, comprising compressing only a portion of a starting fiber optic bundle having such a Z axis and such dimensions X and Y while permitting free stretch along said Z axis, whereby the value of the cross-sectional dimension X is continuously lowered to X' along said Z axis and, if Y' is smaller than Y, also compressing only a portion of said starting fiber optic bundle whereby Y is continuously lowered to Y' along said Z axis.

In yet another aspect, this invention relates to an anamorphic, tapered fused fiber optic bundle prepared by the method of this invention.

In further aspects, this invention provides such embodiments wherein the dimension Y' is also smaller than the dimension Y; wherein the shapes of the first and second ends are selected from rectangular, square, circular, in any combinations. (See FIGS. 1(a)–1(d)). Thus, using this invention a skilled worker can routinely taper fiber optic bundles to match disproportionate formats at each end such as rectangular or square with circular, square with rectangular, one sized rectangular with a differently sized rectangular, circular with elliptical, etc. In all cases, at least one of the orthogonal dimensions X and Y will be different and the ratio of X dimensions at the two ends will be different from the ratio of Y dimensions.

By the compressing operation of this invention, all pixels (individual optical fibers; resolution) along a given axis are compressed at the smaller end of the taper such that the pixels fit essentially precisely from one side of the corresponding imaging device to the other side across such axis. This is accomplished by narrowing the center-to-center fiber spacing at the original (larger) end along such axis to a spacing accommodating such a precise fit. Proportionately, there is a compression of the fiber size along the same axis and an equivalent change in the magnification of the image along such axis (i.e., a proportionate demagnification.)

It is, of course, possible to also modify the center-to-center fiber spacing along the axis orthogonal to the first axis so modified using the method of this invention. These reshaping and redimensioning operations on the ends of the optic fiber bundle ensure that all available pixels in a given cross-sectional plane of a bundle can be utilized actively in association with all of the active surface area of the imaging device at each end. Concomitantly, there is achieved a magnification change (demagnification) and a size change of each individual fiber, both in proportion to the anamorphic dimension change effected along a given cross-sectional axis of the fiber.

The anamorphic optical fibers of this invention can be used to couple any conventional imaging devices in the same fashion as prior art couplers have been utilized, with the advantages, of course, attendant to this invention, such as maximization of resolution, achievement of proper magnification, effective use of active areas, etc.

The term "anamorphic" as used herein requires that the size of the optical fibers in at least one of the X or Y directions (FIG. 1b) is different at one end of the fiber optic taper in comparison to the other end (FIG. 1c) and that the ratio of dimensions X'/X is different from the ratio Y'/Y, wherein X', Y' represent the dimensions at one end and X, Y represent the dimensions at the other end. In other words, one dimension undergoes a change in a proportion different from that undergone by the other dimension. This definition is equivalent to requiring that the center-to-center fiber spacing in at least one dimension is different in one end in comparison to the other end. In turn, inherently this means that the magnification in one dimension at one end will be different from that at the other end. Of course, it is possible that the dimensions along both X and Y axes can be different at the two ends.

Typically, the variation from one end to the other end along the X and/or Y axes will change continuously and at a constant rate. However, continuous changes at varying angular rates are included within the scope of this invention as are tapers where periods of constant dimension interrupt continuously tapering regions. The particular ratio of the dimensions at the two ends is not critical but will be chosen in accordance with the requirements of a given application. Thus, relatively small dimensional changes can be effected, e.g., 1/1.1, larger and smaller variations being possible, as can much larger variations, e.g., but not limited to ½, ⅓, ¼, 1/5, 1/6, 1/7 or even higher where desired and including ratios in between, e.g., 1/2.5, 1/3.2, etc. The angular rate of the taper is also not particularly critical, but should not be too sharp in order to minimize unacceptable distortions, especially at the outer fibers. Typically, taper angles (α; see FIG. 1a) up to 30° can routinely satisfy all requirements. Preferably, the taper angle will be on the order of 20°-25°, the precise angle being routinely chosen as a function of the desired dimension change and the available spacing between the two ends of the fiber bundle, in turn determined by the spacing between the imaging devices where coupling is the desired end result.

There is also no criticality to the overall dimensions of the fiber bundles utilized or of the individual optical fibers used. These will be chosen fully conventionally. Typically, individual fiber outer diameters are in the range of 3-50 μm and overall fiber bundle sizes are in the range of 2-100 mm. Typical optical fiber lengths used to couple imaging devices are normally in the range of 1-12 cm, again, the particular length involved not being critical.

Also uncritical is the nature of the imaging devices which are coupled via the anamorphic taper of this invention. These may freely be chosen from the usual categories such as CCD devices, X-ray scintillator screens, image intensifiers, passive optical detectors and lens systems which otherwise would utilize an anamorphic lens, such as in a camera or telescope view finder requiring a wide field of view in one plane. The use of an anamorphic fused fiber optic bundle in a view finder greatly reduces the overall length and weight of the lens system. Although this specification is written in terms of bundle ends which are perpendicular to the longitudinal axis of the bundle, this invention includes embodiments wherein an imaging device requires a planar surface making a non-perpendicular angle with the longitudinal axis and also to bundle ends which are cut, machined or otherwise treated, to be non-planar.

FIG. 2 shows cross-sectional photomicrographs (806×) of the two ends of a typical anamorphic fiber of this invention. FIG. 2a shows the larger end of the fiber prior to the pressing operation of this invention. FIG. 2b shows the result after a pressing operation along the vertical axis. As can be seen, whereas the center-to-center spacing and size of the optical fibers in the horizontal axis remains unchanged, the center-to-center spacing and the optical fiber size in the vertical axis is shortened at the pressed end (FIG. 2b). As a result, the image is made smaller at the small (pressed) end (demagnification) whereby the entire image from the larger end is able to be applied over a much smaller surface area at the smaller end.

The method of this invention can be carried out in various embodiments. For example, it is possible to independently press along the X and Y axes in separate steps. Alternatively, it is possible to perform a press along one axis followed by a proportional stretch (by conventional drawing) along both axes. In some applications requiring very low optical distortion, the small end of the tapered bundle (X',Y') can be repressed (in the Z axis direction) into a dye with the exact X',Y' dimensions to straighten these sides which often become slightly curved due to the conventional stretching operation. In the latter embodiment, if one desires a ½ (X'/X) variation along the X axis and ½ (Y'/Y) variation along the Y axis, an independent press per this invention parallel to the Y axis to effect a ⅔ change in the X dimension, will result in a ¼ variation in the Y dimension and a ⅔ change (½×⅔) in the X dimension when a conventional stretch is thereafter effected to produce a ½ change along both axes.

The process of this invention can employ as a starting material individual unfused fibers, multi-multi-fiber preforms stacked together, or a completely fused optical fiber bundle. Thus, during the pressing step to effect the taper of this invention, both fusing and tapering can be effected or only tapering need be effected where a fully fused optical fiber bundle is employed.

The temperature to which the optical fiber bundle is to be heated during the tapering step is essentially the same as that conventionally employed in the prior art to perform conventional drawing operations. Typically, the glass will be heated to approximately the softening point of the fiber optic core glass, e.g., about 688° C. for the glass of the examples. The particular time temperature profile can routinely be determined for a given optical fiber bundle in dependence on the normal factors, especially glass composition type, thermal mass, etc. Where simultaneous fusing and tapering are employed, a lower temperature is used, e.g., about 621° C. with a pressure of 5000 psi. The time required to fuse and taper a typical optical part would be in the range of 45 to 60 minutes due to the high viscosity of the fiber optic glass matrix at such temperatures. When the glass is fully displaced and in contact with the dye ends (along the Z axis of the fiber bundle) as well as the top, bottom and sides, the pressure of, e.g., 5000 psi is imposed uniformly which fuses all individual clad fibers together with no interstices. The length of the fibers before fusing and tapering is selected to provide a space at each end whose total volume equals the volume displaced by the tapering operation. The temperature is raised, e.g., to 688° C., for an additional 45 to 60 minutes under pressure to insure total elimination of all voids. The selected temperatures are not too high that the tapering process becomes uncontrollable or the glass is destroyed (e.g., becomes devitrified or the core and/or clad melt). When fusing is also to be achieved, normal operating conditions and procedures will be employed during the taper heating process such that the fused bundle meets the usual specifications such as vacuum tightness, etc. (see, e.g., the various references discussed above). Once the tapering step of this invention is completed, the usual subsequent conventional treatment operations are effected fully conventionally, e.g., cutting, grinding, polishing, etc.

The pressing operation of this invention is performed in any suitable fashion which provides the necessary taper properties without an unacceptable distortion. Use of dyes such as those shown in FIG. 3 has been found to be very effective. Thus, a fused fiber optic material having X and Y dimensions suitable for use with the larger imaging device of interest is placed in a dye 1 (FIG. 3(a)) having dimensions which accommodate the fiber optic material. The die typically will have open ends along the longitudinal axis.

The dye consists of two stationary sides 2 matching one of the dimensions of the fiber optic bundle, i.e., that which is to remain unchanged during the operation. The other two sides of the dye comprise two movable compression rams 4 having elevated sections 3 matching the desired taper to be effected along the other dimension of the fiber optic bundle, as shown in FIGS. 3(a)-(c). It is also possible that one of the sides 4 be stationary. The dye assembly is conventionally heated to the appropriate working temperature of the fiber optic material and the rams are compressed to compress the fiber spacing along the selected dimension to the prescribed extent in accordance with the foregoing to prepare the modified fiber bundle 5 (FIG. 3(b)).

Where an anamorphic ratio is to be achieved only in one dimension, further compression is unnecessary. However, where an anamorphic ratio is to be achieved in the other dimension, then an analogous dye is fabricated wherein the stationary sides accommodate the taper already formed in the optic bundle via the first pressing step. These will correspond to sides 4 of FIGS. 3(a) and (c). The movable compression rams in the second dye will, analogously to those in the first dye, have an elevated section 3 with a shape determined by the desired anamorphic ratio and taper to be achieved. The pressing operation is carried out analogously to the first operation. The fiber optic prepared after the first step 5 is usually annealed prior to carrying out of the second step.

When an anamorphic coupler with a square or rectangle at one end is to be tapered to a circle or ellipse at the other end, a dye (FIGS. 3(d) and 3(e)) can be constructed having stationary sides with a separation matching the diameter of a round fiber optic bundle which will remain unchanged during the operation. The other two sides of the dye comprise two movable compression rams with surfaces 3 machined at the ends 9 in the longitudinal direction with a radius to encompass one half the diameter of the fiber bundle, and proceeding to a flat central section 10 of the surface 3 via a smooth transition. See FIGS. 3(d) (perpendicular views) and 3(e) (cut-away perspective views). When the rams are in full compression, i.e., radius ends are in contact to form the full round bundle diameter, the central portion of the bundle forms a square or rectangle due to compression by the sides of the dye. The area of the square or rectangle can be equal to or smaller than the area of the round end of the fiber bundle. In the case of an ellipse, the major or minor axis would be aligned perpendicular to the sides of the dye. When it is desired that the smaller dimension end be circular or elliptical, an analogous smooth transition is machined in the surface 3 but proceeding from orthogonal dimensions at the ends toward circular or elliptical in the center. In this case, the sides of the dye in the central portion also serve to change the shape of the bundle. Thus, the shape change can be effected in one step where the central portion of the dye matches the finally desired shape, or in two steps where the first step matches only one side to the finally desired shape and the second step matches the remaining side to its final shape, while retaining the shape of the first side as described above.

Alternatively, as discussed above, after the first pressing step, instead of a second pressing step, there can merely follow a conventional stretch of the unidimensionally tapered fiber in order to proportionately decrease the size of the fiber in both dimensions. Where multi-multi-fiber optic fibers are to be simultaneously fused and tapered, precisely the same operations are carried out with dye sizes accommodating the multi-multi-fiber dimensions.

Any alternative system may be utilized in accordance with this invention as long as the results described above are achieved, especially where opposing sides of the fiber optic bundle are simultaneously subjected to equal pressures in order to minimize distortion.

In one alternative embodiment, a dye such as that shown in FIG. 4 can be utilized. In this dye configuration, compression rams 6 rotate into the dye rather than slide as in the embodiment of FIGS. 3(a)-(e). The pivoting action of the rams stretches and compresses the glass simultaneously, thereby lessening stagnation in the boundary fibers in comparison with the results where the dye of FIGS. 3(a)-(e) is utilized. One result is increased uniformity of center-to-center fiber spacing and magnification (from the center of the fiber bundle to the edge.) Fiber optic bundle 7 in this embodiment preferably has an attached flange 8 to prevent inward movement of the bundle during ram compression.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publication, cited above and below, are hereby incorporated by reference.

EXAMPLES

Example 1

Figure 1A:
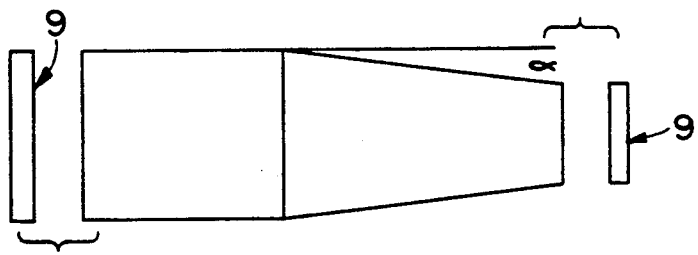
FIGS. 1(a)-(d) illustrate a typical tapered fiber optic bundle of this invention between two imaging devices 9 of different active areas.
Figure 1B:
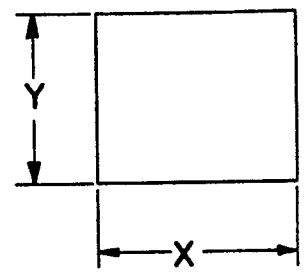
Figure 1C:
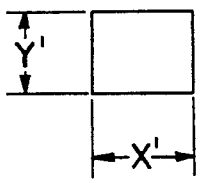
Figure 1D:
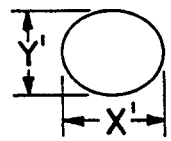
Figure 3A:
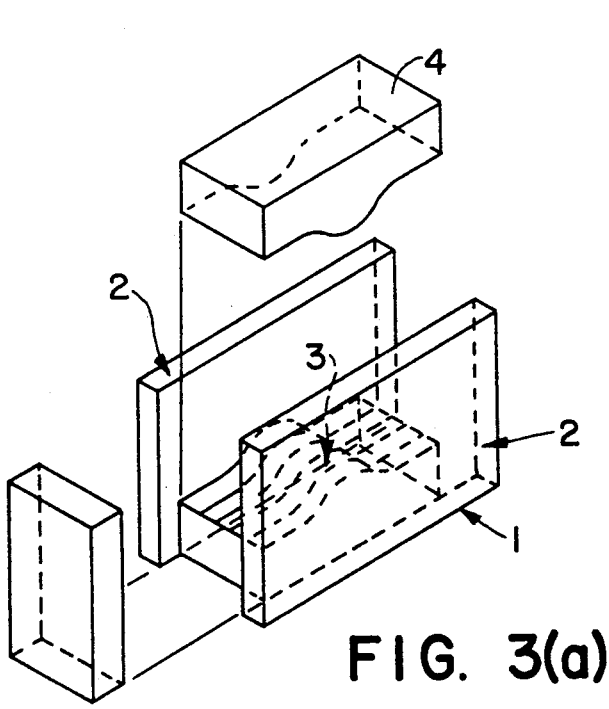
FIGS. 3 and 4 show dye configurations useful for fabricating the tapered fiber optic bundle of this invention.
Figure 3B:
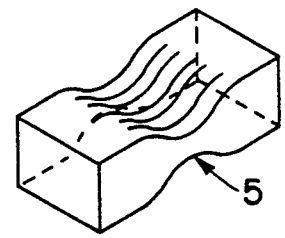
Figure 2A:
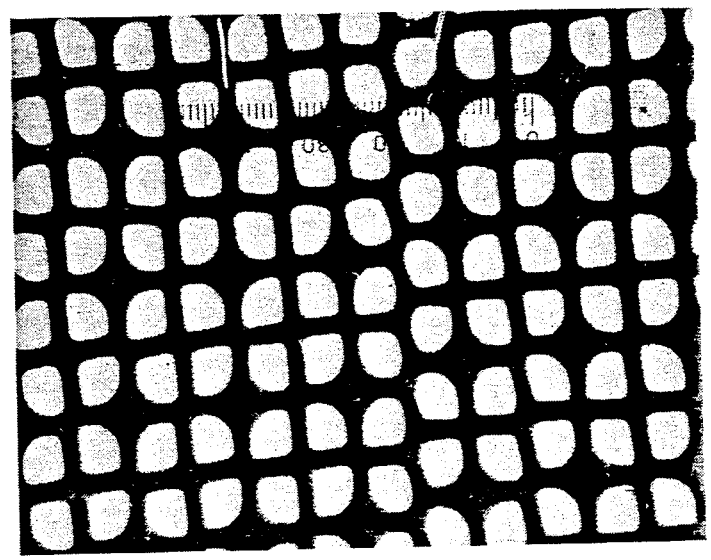
FIGS. 2(a) and (b) show photomicrographs of the two ends of a tapered fiber optic bundle of this invention.
Figure 2B:
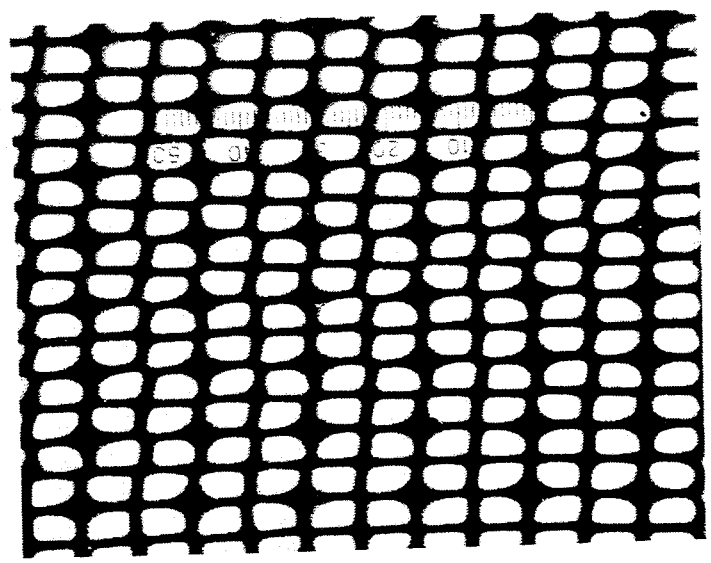
Figure 3C:
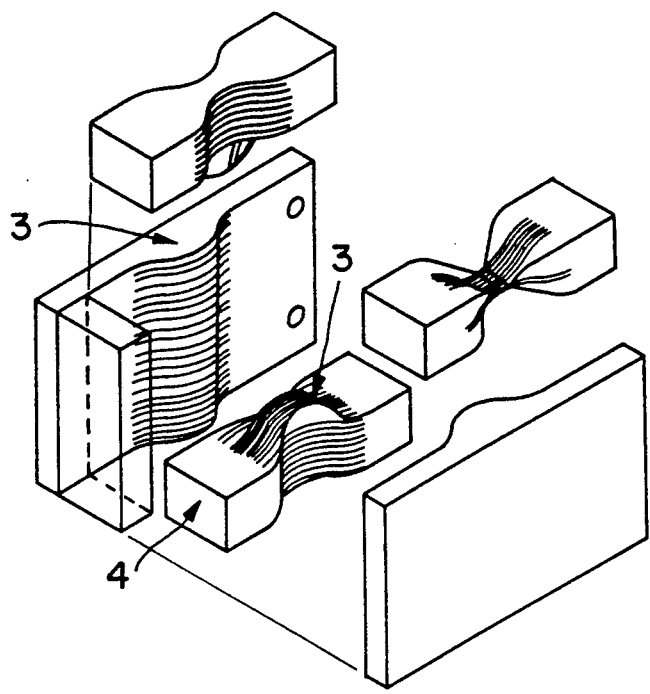
Figures 1, 3D:
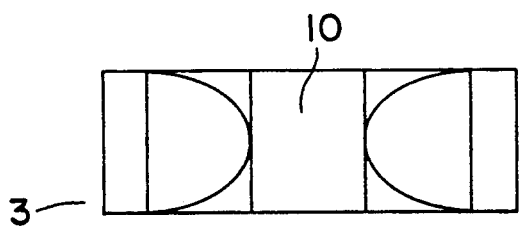
Figures 2, 3D:
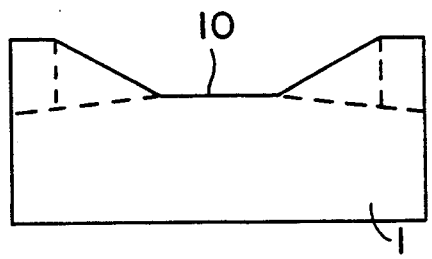
Figures 3, 3D:
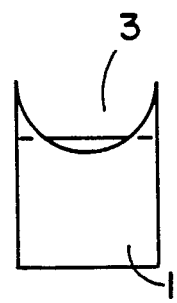
Figures 1, 3E:
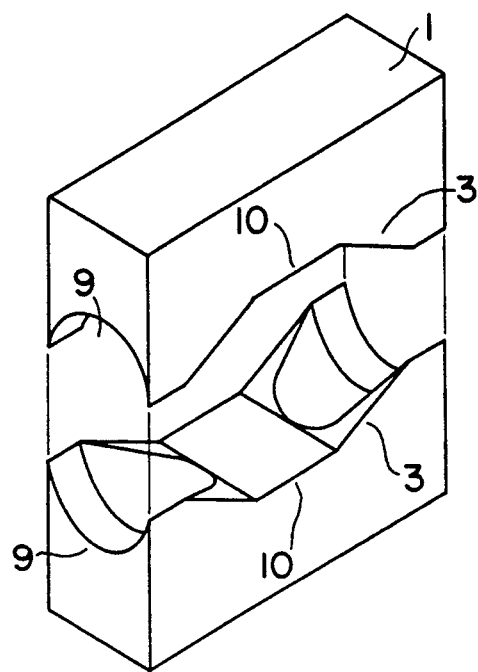
Figures 2, 3E:
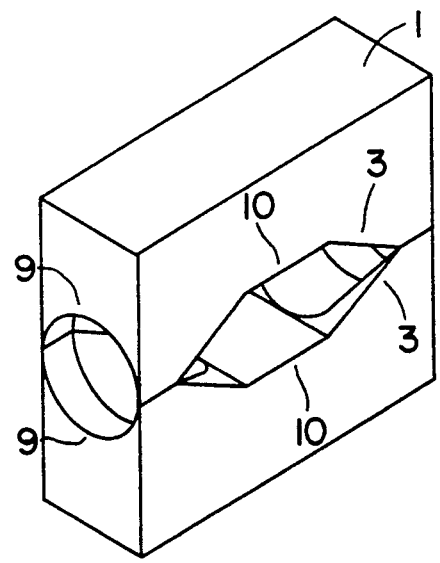
Figure 4:
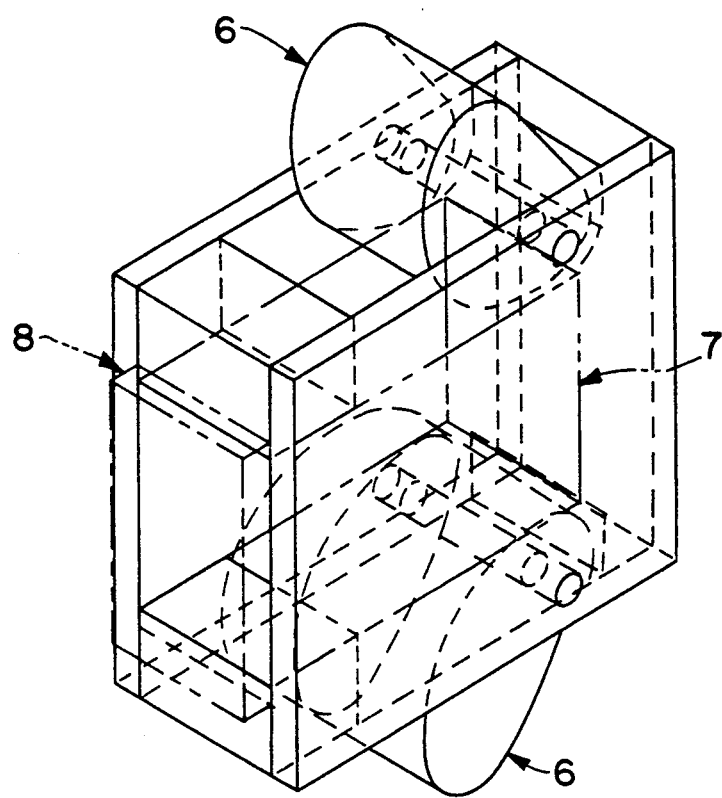

Simultaneous Fusing and Tapering 225 fused fiber optic multi-multi fibers with dimensions of 1.676 mm × 1.676 mm × 66.675 mm containing 24,336 individual mono fibers are assembled in a dye of FIG. 3(e) having a spacing of the stationary sides of 25.14 mm and a length of 76 mm. These dimensions will allow placement of 15 multi-multi fibers across the spacing. One movable compression ram is installed between the stationary sides to form an open cavity into which 15 rows of 15 individual multi-multi fibers (225 total) are placed with an allowance of a 4.663 mm space at each end. The other compression ram is installed to form a sealed cavity. Before pressing, only the central elevated portions of the compression rams are in contact with the fibers. The top and bottom compression rams used in the dye of FIG. 3 have a preformed elevated shape having a taper angle of 30 degrees and a top rectangular surface of dimensions 25.14 mm × 76 mm. The fiber optic bundle/dye combination is heated in a vacuum pressing oven having electric resistance heating elements imbedded in metal platens that are adjusted to be in contact with the movable and stationary sides of the dye (6 surfaces). The platens are attached to hydraulic cylinders that produce the force necessary for fusing and tapering. When the temperature reaches 621° C., the hydraulic cylinders attached to the platens in contact with the movable rams are activated to taper the central portion of the fiber bundle. When the movable rams have traveled to the extent that their non-elevated surface is in contact with the fiber bundle, the hydraulic cylinders attached to the other platens are also activated. The pressure in all cylinders is increased uniformly to impose a force of 5000 psi on the total surface area of the fiber bundle. The force applied to the stationary sides provides support to ensure against deflection of the dye walls. The time required for this portion of the process is 60 minutes and the distance traveled by each movable ram is 6.285 mm. The temperature is increased to 688° C. for an additional 60 minutes with the force still applied to the dye; then it is allowed to cool to 615° C. and transferred to an annealing oven preheated to this same temperature. The annealing oven is adjusted to decrease the temperature approximately 2° C. per minute. At 150° C. the dye is removed and permitted to cool at room temperature.

Example 2

Tapering a Previously Fused Fiber Optic Bundle

A previously fused fiber optic bundle with dimensions of 25.14 mm × 25.14 mm × 66.675 mm is placed into a dye of FIG. 3, having a spacing of the stationary sides of 25.14 mm and a length of 76 mm. One movable compression ram is installed between the stationary sides to form an open cavity into which the fused fiber optic bundle is placed with an allowance of a 4.663 mm space at each end. The other compression ram is installed to form a sealed cavity. Before pressing, only the central elevated portions of the compression rams are in contact with the fiber bundle. The top and bottom compression rams used in the dye of FIG. 3 have a preformed elevated shape having a taper angle of 30 degrees and a top rectangular surface of dimensions 25.14 mm × 76 mm. The fiber optic bundle/dye combination can be heated and pressed with the same equipment and process as the above example; however, a vacuum oven and high pressure (5000 psi) is not required because the bundle has already been fused. A conventional oven with electric resistance heating elements is typically used with modifications made to allow for external attachment of pneumatic cylinders that have rods protruding inside the oven to compress the movable rams of the dye. The fiber optic bundle/dye combination is heated to 688° C. at which time the pneumatic cylinders are activated to impose a force of 800 psi. When each movable ram has traveled a distance of 6.285 mm in 45 minutes, the oven is cooled and the force is released. A similar annealing process as in the above example can be used or, alternatively, if the size of the fiber optic bundle is of the size stated or smaller, it may be removed from the oven and allowed to cool at room temperature; however, the fiber optic bundle must be annealed before cutting. The bundle is annealed by reheating it to 615° C. and then cooling at a rate of 2° C. per minute.

The dye is disassembled and the bundle is conventionally cut, ground and polished at both ends. The resultant anamorphic tapered fiber optic bundle has dimensions at the larger end equal to those of the original bundle (25.14 mm × 25.14 mm) and a smaller end (achieved by conventionally cutting the bundle in the middle region of the tapered portion) of 25.14 mm × 2.57 mm which provides an anamorphic ratio of 2-1, i.e., X axis 2-1 magnification or minification and Y axis 1-1.

The fiber optic bundle as removed from the dye in the above example may be reheated in the central region and stretched by conventional means to result in an overall magnification in both axes while preserving the anamorphic ratio of the X and Y axes. The overall stretch (magnification) ratio is added to each axis. The stretching process tends to bow the sides of the tapered region which can cause distortion; therefore, after the bundle has been cut in this region, both ends are separately placed into a dye having essentially the same dimensions as the bundle ends and are exposed to a pressing treatment in the same temperature range as appropriate for the tapering step for 10 minutes in order to straighten the sides and lessen the distortion.

The above examples use values appropriate for a lanthanum borate core glass (RWY-32; Schott Fiber Optics) and a borosilicate clad glass (8250; Schott).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. An anamorphic, tapered fused fiber optic bundle having a longitudinal axis Z and two ends each having surfaces in a plane (X axis/Y axis) perpendicular to said Z axis, a first of said ends having cross-sectional dimensions X and Y and a second of said ends having cross-sectional dimensions X' and Y', at least X' being smaller than X, and the ratio X'/X being different from the ratio Y'/Y, wherein the X axis dimension of said fiber continuously varies along said Z axis from the value X in said first end to the value X' in said second end and wherein when an image is transferred therethrough from said end surface having the larger dimensions to said end surface having the smaller dimensions, said image is demagnified anamorphically in proportion to the ratios X'/X and Y'/Y.

2. An anamorphic, tapered fused fiber optic bundle of claim 1, wherein Y' is smaller than Y and the Y axis dimension of said fiber continuously varies along said Z axis from the value Y in said first end to the value Y' in said second end.

3. An anamorphic, tapered fused fiber optic bundle of claim 1, wherein the cross-sectional shape of said first end is rectangular and that of said second end is rectangular.

4. An anamorphic, tapered fused optic bundle of claim 1, wherein the cross-sectional shape of said first end is rectangular and that of said second end is square or wherein the cross-sectional shape of said first end is square and that of said second end is rectangular.

5. An anamorphic, tapered fused fiber optic bundle of claim 1, wherein the cross-sectional shape of said first end is circular and that of said second end is rectangular.

6. An anamorphic, tapered fused fiber optic bundle of claim 1, wherein the cross-sectional shape of said first end is circular and that of said second end is square.

7. An anamorphic, tapered fused fiber optic bundle of claim 1, wherein the ratio X'/X is 1/7–1/1.1.

8. An anamorphic, tapered fused fiber optic bundle of claim 1, wherein the taper angle formed by said continuous variation along said X-axis is less than 30°.

9. A method of preparing an anamorphic, tapered fused fiber optic bundle having a longitudinal axis Z and two ends each having surfaces in a plane (X-axis/Y-axis) perpendicular to said Z axis, a first of said ends having cross-sectional dimensions X and Y and a second of said ends having dimensions X' and Y', at least X' being smaller than X, and the ratio X'/X being different from the ratio Y'/Y and wherein when an image is transferred therethrough from said end surface having the larger dimensions to said end surface having the smaller dimensions, said image is demagnified anamorphically in proportion to the ratios X'/X and Y'/Y, comprising compressing only a portion of a starting fiber optic bundle having such a Z axis and such dimensions X and Y while permitting free stretch along said Z axis, whereby the value of the cross-sectional dimension X is continuously lowered to X' along said Z axis and, if Y' is smaller than Y, also compressing only a portion of said starting fiber optic bundle whereby Y is continuously lowered to Y' along said Z axis.

10. A method of claim 9, wherein said compression whereby X is lowered to X' is carried out separately from said compression whereby Y is lowered to Y'.

11. A method of claim 9, wherein the cross-sectional shape of said first end is rectangular and that of said second end is rectangular.

12. A method of claim 9, wherein the cross-sectional shape of said first end is rectangular and that of said second end is square or wherein the cross-sectional shape of said first end is square and that of said second end is rectangular.

13. A method of claim 9, wherein the cross-sectional shape of said first end is circular and that of said second end is rectangular.

14. A method of claim 9, wherein the cross-sectional shape of said first end is circular and that of said second end is square.

15. A method of claim 9, wherein the starting fiber optic bundle is a fully fused fiber optic bundle.

16. A method of claim 9, wherein the starting fiber optic bundle is unfused and becomes fused during said compression step.

17. A method of claim 9, wherein the ratio X'/X is 1/7–1/1.1.

18. A method of claim 9, wherein the taper angle formed by said continuous variation along said X-axis is less than 30°.

19. A method of claim 9 further comprising, after one of said compressing steps, stretching said optic bundle to further reduce the magnitude of X' and Y'.

20. A method of claim 19 wherein after said stretching step said second end is compressed into a dye having dimensions essentially equal to those of said second end thereby alleviating any curvature of the sides of said end.

21. An anamorphic, tapered fused fiber optic bundle prepared by the method of claim 9.

22. An optical combination comprising
   a first and second imaging device each having active surfaces, wherein at least one dimension of said active surface of said first device is different from the corresponding dimension of said second device, and coupling said two imaging devices, an anamorphic, tapered fused fiber optic bundle of claim 1.

23. An anamorphic, tapered fused fiber optic bundle of claim 1, wherein the individual optical fibers have outer diameters of about 3-50 µm.

24. A method of claim 9, wherein the individual optical fibers have outer diameters of about 3-50 µm.

* * * * *